[19] United States Patent
Idel et al.

[11] 4,415,692
[45] Nov. 15, 1983

[54] STABILIZED THERMOPLASTIC MOULDING COMPOSITIONS

[75] Inventors: Karsten Idel; Hans-Josef Buysch, both of Krefeld; Horst Peters, Leverkusen; Josef Buekers, Krefeld, all of Fed. Rep. of Germany

[73] Assignee: Bayer Aktiengesellschaft, Leverkusen, Fed. Rep. of Germany

[21] Appl. No.: 268,365

[22] Filed: May 29, 1981

[30] Foreign Application Priority Data

Jun. 10, 1980 [DE] Fed. Rep. of Germany ....... 3021726

[51] Int. Cl.$^3$ .............................................. C08K 5/55
[52] U.S. Cl. ...................................... 524/183; 525/67
[58] Field of Search ................... 260/45.7 R, 45.8 RB; 525/67; 524/183

[56] References Cited

U.S. PATENT DOCUMENTS 3,130,177  4/1964  Grabowski ........................... 525/67
3,361,672  1/1968  Andress, Jr. et al. ....... 260/45.8 RB
3,669,926  6/1972  Cyba ............................ 260/45.8 RB
3,864,428  2/1975  Nakamura et al. .................... 525/67
4,146,517  3/1979  Leistner et al. ..................... 524/183
4,211,679  7/1980  Mark et al. .......................... 524/183
4,225,483  9/1980  Eimers et al. .................. 260/45.7 R

FOREIGN PATENT DOCUMENTS 1170141  5/1964  Fed. Rep. of Germany .
1239471  4/1967  Fed. Rep. of Germany .

*Primary Examiner*—John Kight, III
*Assistant Examiner*—R. A. White
*Attorney, Agent, or Firm*—Connolly and Hutz

[57] ABSTRACT

This invention relates to the thermal stabilization of mixtures of aromatic polycarbonates and ABS polymers using 0.01 to 3% by weight, based on the total mixture, of esters of boric acid, in particular with ortho and/or para-alkyl substituted phenols or the corresponding bis-phenols.

3 Claims, No Drawings

STABILIZED THERMOPLASTIC MOULDING COMPOSITIONS

Mixtures of ABS polymers and aromatic polycarbonates are known (German Patent No. 1,170,141), as are also corresponding mixtures with styrene/acrylonitrile copolymers as a third constituent (German Auslegeschrift No. 1,810,993). Mixtures of aromatic polycarbonates with special ABS polymers have been described in German Pat. No. 2,259,656 and German Offenlegungsschriften Nos. 2,329,548 and 2,329,546.

When such mixtures are processed, surface faults in the form of bubbles or streaks are liable to occur at temperatures of up to 300° C., especially during the manufacture of parts having a large surface area.

The present invention relates to mixtures of aromatic polycarbonates and ABS polymers which contain from 0.01 to 3% by weight, preferably from 0.05 to 2% by weight, based on the total mixture, of one or more esters of boric acid, in particular esters of boric acid with ortho and/or para-alkyl substituted phenols or the corresponding bis-phenols.

The invention in particular relates to mixtures of:
1. 10–90 parts by weight of an aromatic polycarbonate;
2. 90–10 parts by weight of a mixture of:
2.1 25–100 parts by weight of a graft copolymer of a monomer mixture polymerised on a rubber, the said mixture consisting, on the one hand, of styrene, methyl-methacrylate or a mixture thereof and, on the other hand, acrylonitrile, methacrylonitrile or mixtures thereof;
2.2 0–20 parts by weight of a butadiene polymer having a butadiene content of at least 5% by weight; and
2.3 0–75 parts by weight of a copolymer of, on the one hand, styrene, α-methylstyrene or a mixture thereof and, on the other hand, methyl methacrylate, acrylonitrile, methacrylonitrile or a mixture thereof, which contain as stabilizers, one or more esters of boric acid with ortho and/or para-alkyl substituted phenols or bis-phenols in quantities of from 0.01–3.0% by weight, preferably from 0.05–2.0% by weight, based on the total mixture.

The invention further relates to the use of esters of boric acid, in particular esters of boric acid with ortho and/or para-alkyl substituted phenols or the corresponding bis-phenols, in quantities of from 0.01 to 3.0% by weight, preferably from 0.05 to 2.0% by weight, based on the total mixture, for the thermal stabilization of mixtures of aromatic polycarbonates and ABS polymers.

The thermostabilization according to the present invention improves not only the thermal characteristics of the products but also the surface, as well as increasing the stability of the melt and improving the mechanical properties of the stabilized products.

Boric acid esters suitable for the purpose of the invention include those corresponding to general formula (I):

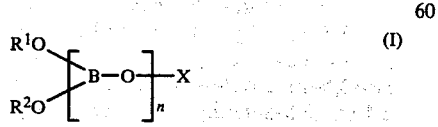

wherein
X represents hydrogen, a substituted or unsubstituted aliphatic, cycloaliphatic or aromatic group having 1–18 C atoms or an alkaryl or aralkyl group having 7–24 C atoms, and each of the groups may also contain olefinic double bonds and hetero atoms (preferably O, S, P or non-basic nitrogen atoms),
n represents an integer from 1–4, preferably 1 or 2, according to the valency of X,
$R^1$ and $R^2$ represent, independently of each other, $C_1$–$C_{18}$ alkyl, $C_5$–$C_{15}$ cycloalkyl, $C_7$–$C_{24}$ aralkyl or alkaryl or $C_6$–$C_{24}$ aryl or a straight-chain or branched-chain $C_1$–$C_9$ alkyl or $C_5$–$C_7$ cycloalkyl group which may be substituted with 3- to 6-membered cyclic groups which may contain O and S as hetero atoms.

The group X may be chemically bonded to $R^1$ or $R^2$ and have the same meaning as $R^1$ or $R^2$.

Boric acid esters corresponding to formula (II) below are also suitable:

wherein
$R^1$ and $R^2$ have the meaning indicated above for formula (I).

Boric acid esters corresponding to formula (III) are also suitable for the purpose of the invention:

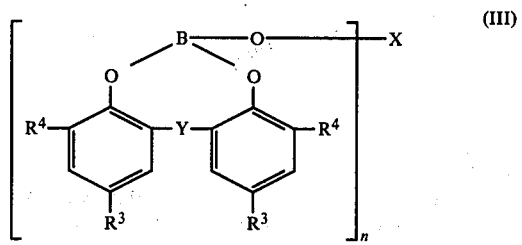

wherein
X and n have the meanings already indicated for formula (I);
$R^3$ and $R^4$ may be identical or different and represent $C_1$–$C_9$ aliphatic, $C_5$–$C_6$ cycloaliphatic, $C_7$–$C_9$ aralkyl or $C_6$–$C_{10}$ aryl groups; and
Y represents S or $HCR^5$ wherein $R^5$=H, or a $C_1$–$C_6$ alkyl, cyclohexenyl or cyclohexyl group.

The substituents for the groups denoted by X are preferably OH, $C_1$–$C_4$ alkoxy, SH, $C_1$–$C_4$ alkylmercapto, $C_1$–$C_{12}$ alkyl, $C_5$–$C_6$ cycloalkyl, $C_7$–$C_{12}$ aralkyl, $C_6$–$C_{10}$ aroxy or $C_6$–$C_{10}$ aryl groups.

X is preferably a hydrogen atom or a group corresponding to the general formula (IV):

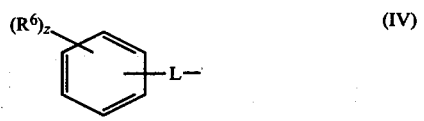

wherein
$R^6$ represents hydrogen, L, aryl, a condensed ring, a $C_1$–$C_9$ alkyl, $C_7$–$C_{12}$ alkyl aryl, $C_1$–$C_4$ alkylmercapto, $C_1$–$C_4$ alkoxy or β-hydroxy alkoxy group or an OH, amino or SH group or a group of the formula

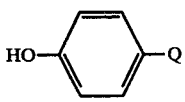

wherein
Q is a single bond, O, S, O—(CH₂)₂—O or a $C_1$–$C_4$ alkylidene group, and
z represents 1 or 2 and
L represents a direct bond or an alkyleneoxy group or a group corresponding to the general formula (V):

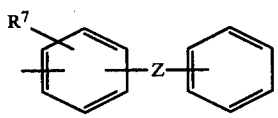

(V)

wherein
$R^7$ represents OH or H, and
Z represents a single bond, a $C_1$–$C_4$ alkylidene group, O, S or O—(CH₂)₂—O or a monovalent or divalent $C_1$–$C_{18}$ alkyl group substituted by phenyl, OH or phenoxy and optionally attached through ether bridges or S-bridges, or it denotes a $C_1$–$C_{10}$ alkylcyclohexyl or tetraallyl group or a group corresponding to the general formula (VI):

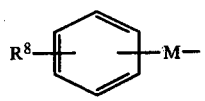

(VI)

wherein
$R^8$ represents H, M, a hydroxy alkyl group, a hydroxy alkoxy group, an alkylene group, H, OH or a bond, and
M represents an alkylene or alkylene cycloalkyl group.
In addition, X may represent

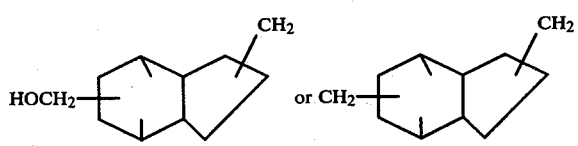

or alkoxylation products of glycerol, trimethylol propane or pentaerythritol with 3-8-oxyethyl or oxypropyl groups.

Boric acid esters corresponding to formula (VII) are also suitable for the purpose of the invention:

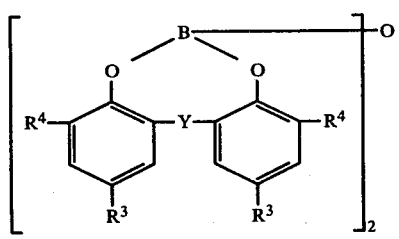

(VII)

wherein

Y, $R^3$ and $R^4$ have the meanings indicated above.

Stabilizers corresponding to formula (I) and (II) wherein X represents a hydrogen atom and $R^1$ and $R^2$ are aromatic groups, preferably substituted with $C_1$–$C_9$ alkyl groups in the o- and or p-position to the ester bond, are preferred.

Particularly preferred are compounds of formulae (III) and (VIII) wherein
X represents H; $R^3$, a $C_1$–$C_9$ alkyl group, a $C_5$–$C_6$ cycloalkyl group, a $C_7$–$C_9$ aralkyl group or a $C_6$–$C_{10}$ aryl group;
$R^4$ represents a benzyl, α-methylbenzyl, α,α-dimethylbenzyl, methyl, ethyl, isopropyl, tertiary butyl, tertiary amyl, isononyl, cyclopentyl or cyclohexyl group; and
Y represents S, CH₂, C₃—CH, CH₃CH₂CH, CH₃CH₂CH₂—CH, (CH₃)₂CH—CH,

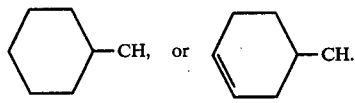

Any thermoplastic polycarbonates are suitable in principle for the moulding compositions according to the invention.

By "aromatic polycarbonates" are meant, in the context of this invention, homopolycarbonates and copolycarbonates based, for example, on one or more of the following diphenols:
hydroquinone;
resorcinol,
dihydroxy diphenyls,
bis-(hydroxyphenyl)-alkanes;
bis-(hydroxyphenyl)-cycloalkanes;
bis-(hydroxyphenyl)-sulphides;
bis-(hydroxyphenyl)-ethers;
bis-(hydroxyphenyl)-ketones;
bis-(hydroxyphenyl)-sulphoxides;
bis-(hydroxyphenyl)-sulphones; and
α,α'-bis-(hydroxyphenyl)-diisopropylbenzenes,
and their derivatives which are alkylated or halogenated in the nucleus. These and other suitable diphenols have been described, for example, in U.S. Pat. Nos. 3,028,365; 2,999,835; 3,148,172; 3,275,601; 2,991,273; 3,271,367; 3,062,781; and 2,999,846; German Offenlegungsschriften Nos. 1,570,703; 2,063,050; 2,063,052; 2,211,956 and 2,211,957; French Pat. No. 1,561,518 and the monograph "H. Schnell, Chemistry and Physics of Polycarbonates, Interscience Publishers, New York, 1964".

The following are examples of preferred diphenols:
4,4'-dihydroxydiphenyl;
2,2-bis-(4-hydroxyphenyl)-propane;
2,4-bis-(4-hydroxyphenyl)-2-methylbutane;
1,1-bis-(4-hydroxyphenyl)-cyclohexane;
α,α'-bis-(4-hydroxyphenyl)-p-diisopropyl benzene;
2,2-bis-(3-methyl-4-hydroxyphenyl)-propane;
2,2-bis-(3-chloro-4-hydroxyphenyl)-propane;
bis-(3,5-dimethyl-4-hydroxyphenyl)-methane;
2,2-bis-(3,5-dimethyl-4-hydroxyphenyl)-propane;
bis-(3,5-dimethyl-4-hydroxyphenyl)-sulphone;
2,4-bis-(3,5-dimethyl-4-hydroxyphenyl)-2-methylbutane;
1,1-bis-(3,5-dimethyl-4-hydroxyphenyl)-cyclohexane;
α,α'-bis-(3,5-dimethyl-4-hydroxyphenyl)-p-diisopropyl benzene;

2,2-bis-(3,5-dichloro-4-hydroxyphenyl)-propane; and 2,2-bis-(3,5-dibromo-4-hydroxyphenyl)-propane.

The following diphenols, for example, are particularly preferred:
2,2-bis-(4-hydroxyphenyl)-propane;
2,2-bis-(3,5-dimethyl-4-hydroxyphenyl)-propane;
2,2-bis-(3,5-dichloro-4-hydroxyphenyl)-propane;
2,2-bis-(3,5-dibromo-4-hydroxyphenyl)-propane; and
1,1-bis-(4-hydroxyphenyl)-cyclohexane.

Preferred aromatic polycarbonates are those based on one or more of the diphenols which have been mentioned as being particularly preferred. Copolycarbonates based on 2,2'-bis-(4-hydroxyphenyl)-propane and one of the other particularly preferred diphenols mentioned above are particularly preferred. Polycarbonates based solely on 2,2-bis-(4-hydroxphenyl)-propane or 2,2-bis-(3,5-dimethyl-4-hydroxphenyl)-propane are also particularly preferred.

The aromatic polycarbonates may be prepared by known methods, e.g. by solvent-free ester interchange from bisphenol and diphenyl carbonate or in solution from bisphenols and phosgene. The solution may be homogeneous ("pyridine process") or heterogeneous ("diphasic interface process"). According to the invention, polycarbonates which have been prepared in solution are particularly preferred, in particular those prepared by the diphasic interface process.

The aromatic polycarbonates may be branched by the incorporation of small quantities, preferably from 0.05 to 2.0 mol percent, based on the quantity of diphenyls used, of trifunctional or higher functional compounds, e.g. compounds having three or more than three phenolic hydroxyl groups.

Polycarbonates of this type have been described, e.g. in German Offenlegungsschriften Nos. 1,570,533; 1,595,762; 2,116,974; 2,113,347 and 2,500,092, in British Pat. No. 1,079,821 and in U.S. Pat. No. 3,544,514.

Examples of suitable compounds having three or more than three phenolic hydroxyl groups include phloroglucinol; 4,6-dimethyl-2,4,6-tri-(4-hydroxyphenyl)-heptene-(2); 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenyl methane; 2,2-bis-4,4-bis-(4-hydroxyphenyl)-cyclohexyl propane; 2,4-bis-(4-hydroxyphenylisopropyl)-phenol; 2,6-bis-(2'-hydroxy-5'-methyl-benzyl)-4-methyl phenol; 2,(4-hydroxyphenyl)-2-(2,4-dihydroxyphenyl)-propane and 1,4-bis-(4,4''-dihydroxy triphenyl-methyl)-benzene. Other tri-functional compounds include 2,4-dihydroxybenzoic acid, trimesic acid, cyanuric chloride and 3,3-bis-(4-hydroxyphenyl)-2-oxo-2,3-dihydroindole.

The aromatic polycarbonates should generally have average molecular weights $M_w$ ranging from 10,000 to 200,000 or even more, preferably from 20,000 to 80,000 (determined by relative viscosity measurements in $CH_2Cl_2$ at 25° C. at a concentration of 0.5% by weight).

In the case of polycarbonate mixtures, the high molecular weight polycarbonates having $M_w$ 10,000 to 200,000 may also contain small proportions of low molecular weight polycarbonates, e.g. with an average degree of polymerisation of 2 to 20.

Another constituent of the moulding compositions is a graft polymer (2.1) in which a monomer mixture of 95-50% by weight of styrene, methylmethacrylate or mixtures thereof and 5-50% by weight of acrylonitrile, methyl methacrylate or mixtures thereof is graft polymerised onto a rubber. Suitable rubbers include in particular polybutadiene, butadiene/styrene copolymers containing up to 30% by weight of polymerised styrene, copolymers of butadiene and acrylonitrile containing up to 20% by weight of acrylonitrile and copolymers of butadiene with up to 20% by weight of a lower alkyl ester of acrylic or methacrylic acid (e.g. methyl acrylate, ethyl acrylate, methyl methacrylate and ethyl methacrylate); in principle, any elasticizing components are suitable, provided that they have rubbery elastic properties.

In addition to the graft polymer, the moulding composition may contain a butadiene polymer (2.2).

The butadiene polymers contained in the moulding compositions are preferably copolymers of from 5-95% by weight of butadiene and 70-5% by weight of acrylonitrile, acrylic acid, methacrylic acid, $C_1-C_6$ alkyl esters of acrylic or methacrylic acid (methyl methacrylate being particularly preferred), divinyl benzene and mixtures of these comonomers. Particularly suitable are copolymers of 70-90% by weight of butadiene and 30-10% by weight of styrene, copolymers of 60-95% by weight of butadiene and 40-5% by weight of methylmethacrylate, copolymers of 30-95% by weight of butadiene and 70-5% by weight of butyl acrylate, and copolymers of 60-80% by weight of butadiene and 40-20% by weight of acrylonitrile. The latter copolymers may, in addition, contain minor quantities (up to a total of ca. 10%) of methacrylic acid and/or divinyl benzene incorporated by polymerisation. Examples of terpolymers and quaternary polymers of the last mentioned type include copolymers of 63% by wt. butadiene, 34% by wt. acrylonitrile and 3% by wt. methacrylic acid as well as copolymers of 60% by weight of butadiene, 36% by weight of acrylonitrile, 3% of methacrylic acid and 1% of divinyl benzene.

In addition to the graft copolymer, the moulding composition may contain a copolymer (2.3) of the graft monomers or similar monomers. The copolymers consist of 95-50% by weight of styrene, α-methyl styrene, methyl methacrylate or mixtures thereof and 5-50% by weight of acrylonitrile, methacrylonitrile, methyl methacrylate or mixtures thereof. Such copolymers are frequently obtained as by-products of graft polymerisation, particularly when large quantities of monomers are grafted on small quantities of rubber, but separately prepared copolymers of this type may also be added in addition to or instead of these copolymers.

The moulding compositions according to the invention may be obtained by simple mixing of the individual components. In a preferred method of preparation, the latices of the graft polymer (2.1) and optionally of the butadiene polymer (2.2) and of the copolymer (2.3) are first mixed and the solids are then precipitated together and dried, and subsequently the resulting pulverulent mixture is mixed with the polycarbonate. The individual components of the moulding compositions according to the invention may also be prepared separately and the mixed in known mixing apparatus, for example, mixing rollers, extruder screws or internal mixers.

Incorporation of the stabilizers according to the invention may be carried out by any known method. For example, they may be incorporated in the individual components of the mixture by means of kneaders or screw extruders or they may be added at the stage when the various individual components are thermoplastically processed to form the total mixture or they may be subsequently incorporated in the complete mixture. The individual components of the moulding compositions according to the invention either contain additives such as stabilizers, flame protective agents, pigments, levelling agents, lubricants, mould release agents or antistatic agents or these additives may be added when mixing the individual components.

The moulding compositions to the present invention may be used for the production of all types of moulded bodies, in particular for the production of moulded bodies by injection moulding. Examples of products for which they may be used include parts of housings of all types (e.g. for domestic implements such as juice extractors, coffee machines or mixers) or cover plates in the building industry and parts for the motor vehicle manufacturing industry. They are also used in the field of electro technology because of their excellent electrical properties. Another form of processing is the production of moulded bodies by deep drawing previously produced plates or foils.

EXAMPLES

EXAMPLE 1

Boric acid ester of phenol and bis-(2-hydroxy-3-cyclohexyl-5-methylphenyl)-methane.

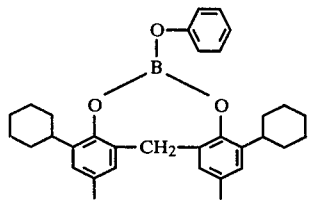

A mixture of 145 g (0.5 mol) of triphenyl borare and 196 g (0.5 mol) of bis-(2-hydroxy-2-cyclohexyl-5-methylphenyl)-methane is heated to 100°-218° C. at 8-10 mb so that 92 g of phenol are distilled off. 248 g of the desired product mentioned above are obtained in the form of a yellowish, brittle resin.

EXAMPLE 2

Boric acid ester of bis-(2-hydroxy-3-cyclohexyl-5-methylphenyl)-methane.

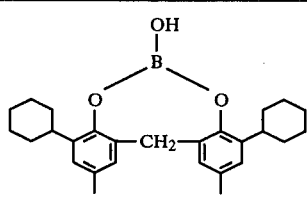

126 g (0.25 mol) of the product of Example 1 are dissolved in anhydrous dioxane and boiled under reflux with 4.5 g (0.25 mol) of water for 3 hours. After removal of the dioxane by distillation followed by the removal of 22 g of phenol by distillation at 10-12 mb, 105 g of a yellow, brittle resin are obtained.

EXAMPLE 3

Boric acid ester of stearyl alcohol and bis-(2-hydroxy-3-cyclohexyl-5-methylphenyl)-methane.

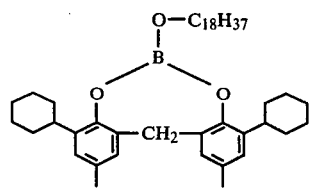

126 g (0.25 mol) of the product of Example 1 are heated to 150°-200° C. with 68 g (0.25 mol) of stearyl alcohol at 10-12 mb, 22 g of phenol being distilled off in the process. 171 g of a yellow resin are obtained.

EXAMPLE 4

Boric acid ester of bis-(2-hydroxy-3-tertiary butyl-5-methylphenyl)-methane.

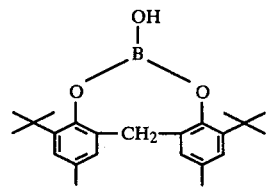

A mixture of 145 g (0.5 mol) of the triphenyl ester of boric acid and 9 g (0.5 mol) of water are stirred together for about 2 hours at 80°-100° C. under nitrogen. 170 g (0.5 mol) of bis-(2-hydroxy-3-tertiary butyl-5-methylphenyl)-methane are then added and the reaction mixture is heated to 85°-180° C. at 20 mb, 140 g of phenol being distilled off in the process.

183 g of a yellow, brittle resin melting at 150°-152° C. are obtained as residue (from ligroin).

EXAMPLE 5

Boric acid ester of phenol and bis-(2-hydroxy-3,5-dimethylphenyl)-isobutane-(1,1).

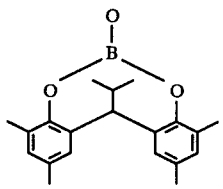

A mixture of 149 g (0.5 mol) of 1,1-bis-(2-hydroxy-3,5-dimethylphenyl)-isobutane and 145 g (0.5 mol) of triphenyl borate is heated to 106°-215° at 25 mb, 92 g of phenol being distilled off in the process. 200 g of a yellowish brittle resin melting at 140°-143° C. are obtained (from benzene).

| Analysis: | |
|---|---|
| Found | Calculated |
| B 2.5-2.6% | 2.75% |
| C 77.9-78.4% | 78.0% |

EXAMPLE 6

Boric acid ester of bis-(2-hydroxy-3-styryl-5-methylphenyl)-methane

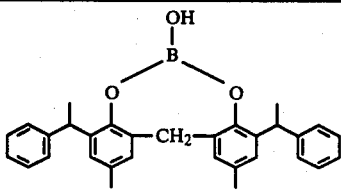

A mixture of 87 g (0.3 mol) of triphenyl borate and 5.4 g (0.3 mol) of water is stirred under nitrogen at 80°–100° C. for 2 hours. 131 g (0.3 mol) of bis-(2-hydroxy-3-styryl-5-methyl-phenyl)-methane are added and the mixture is heated at 102°–215° at 25 mb. 83 g of phenol are distilled off. The desired product mentioned above is obtained as a light brown, brittle resin which cannot be crystallized (158 g).

EXAMPLE 7

Boric acid ester of bis-(2-hydroxy-3-tertiary butyl-5-methylphenyl)-sulphide.

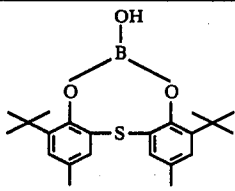

A mixture of 87 g (0.3 mol) of triphenyl borate and 5.4 g (0.3 mol) of water is heated to 80°–100° C. under nitrogen for 2 hours with stirring. 107 g (0.3 mol) of bis-(2-hydroxy-3-tertiary butyl-5-methyl-phenyl)-sulphide are added and the reaction mixture is heated to 80° C. and the temperature gradually increased up to 220° C. at 20–25 mb. 80 g of phenol are distilled off in the process and 118 g of the desired product indicated above are obtained as a light brown brittle resin.

EXAMPLE 8

Boric acid ester of phenol and bis-(2-hydroxy-3-styryl-5-methyl-phenyl)-methane.

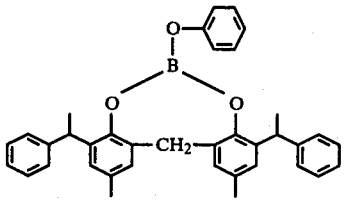

A mixture of 131 g (0.3 mol) of bis-(2-hydroxy-3-styryl-5-methyl-phenyl)-methane and 87 g (0.3 mol) of triphenyl borate is heated to temperatures of from 102° to 235° C. at 25–30 mb. 54 g of phenol are distilled off. 162 g of the compound indicated above are left in the sump as a yellowish brown noncrystallizing resin.

| Analysis: | |
|---|---|
| Found | Calculated |
| B 2.0–2.1% | 2.01% |
| C 79.7–81.3% | 81.5% |

EXAMPLE 9

Boric acid ester of bis-(2-hydroxy-3-cyclohexyl-5-methyl-phenyl)-sulfide.

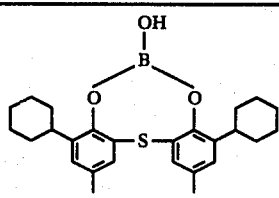

A mixture of 5.4 g (0.3 mol) of water and 87 g (0.3 mol) of triphenyl borate is heated to 80°–100° C. under nitrogen for 2–3 hours with stirring. 123 g (0.3 mol) of bis-2-hydroxy-3-cyclohexyl-5-methyl-phenyl)-sulphide are added and the reaction mixture is heated to 80° C. and gradually increased up to 230° C. at 20–22 mb. 80 g of phenol are distilled off. 133 g of the desired product indicated above are obtained as a light brown resin.

| Analysis: | |
|---|---|
| Found | Calculated |
| B 2.5–2.6% | 2.52% |
| C 71.7–71.8% | 71.5% |

EXAMPLE 10

Boric acid ester of phenol and bis-(2-hydroxy-3-styryl-5-methyl-phenyl)-sulphide.

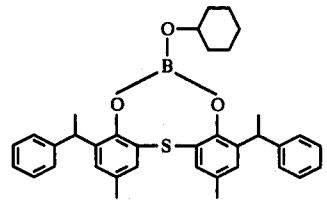

136 g (0.3 mol) of bis-(2-hydroxy-3-styryl-5-methyl-phenyl)-sulphide and 87 g (0.3 mol) of triphenyl borate are heated to 120° and gradually increased up to 230° C. at 20 mb, and 81 g of phenol are distilled off. The product indicated above is obtained as residue in the form of a brittle resin (141 g).

EXAMPLE 11

Preparation of tris-2,2-dimethylene oxide-butyl borate.

235.2 g (1.02 mol) of tributyl borate are mixed with 712.5 g of 3-ethyl-3-hydroxyethyl oxetane. 1.5 g of sodium methylate are then added. The solution is heated to raise the temperature of 160° C. within 3 hours with stirring and introduction of nitrogen. 200 g of distillate are removed over a distillation column at a head temperature of 117°–118° C. The reaction mixture is then cooled, the column is removed and a vacuum of 20 torr is applied. Under these conditions, a further 24 g of distillate are removed when the reaction mixture is reheated to a sump temperature of 120° C. The residue is fractionated under a high vacuum. After a first runnings of 365 g which distills over at 75°–165° C./0.2 torr, the reaction product distills over in the region of 165°–170° C./0.2 torr. 256 (70.4% of the theoretical yield) are obtained. $N_{20}{}^D$:1.4627

| Analysis: | |
|---|---|
| Found | Calculated |
| C 61.4–6 | 60.76 |
| H 9.26 | 9.27 |
| B 3.1 | 3.09 |

The moulding compositions described in the following examples were obtained either on an internal kneader at 230° or in a double shaft extruder at 260° C. by mixing the ABS polymer with the polycarbonate component and the given stabilizer.

The properties of the moulding compositions were determined by the following methods:

1. Notched impact strength according to DIN 53 453 at room temperature. The test samples were produced in screw extruders at the given reaction temperatures.
2. Optical assessment was carried out on injection moulded sample plates (60×40×2 mm) on the basis of an assessment scale of 1–7 in which
   1 denotes flawless surface,
   3–4 denotes slight but acceptable surface flaws and
   7 denotes severe streaks.
3. The Intrinsic Melt Index (IMI) and the theoretical half life $t_h$ were determined according to DIN 53 735 at 260° C. under a 5 kg load.

A polycarbonate based on bisphenol A having a relative solution viscosity, $\eta$ rel, =1.290 to 1.300 (0.5 g of polycarbonate in 100 ml of methylene chloride at 25° C.) and the following ABS polymers were used:

ABS polymer A a. 60 parts by weight of a graft polymer prepared by grafting 35 parts by weight of styrene and 15 parts by weight of acrylonitrile on 50 parts by weight of a coarse textured polybutadiene (by emulsion polymerisation according to the method indicated in German Auslegeschriften Nos. 1,247,665 and 1,269,360) in which the average particle diameter of the polybutadiene graft basis in the latex form is from 0.3–0.4μ and 40 parts by weight of a styrene/acrylonitrile copolymer having a styrene/acrylonitrile ratio of 70:30 and an intrinsic viscosity of $[\eta]=79.1$ (determination in dimethyl formamide at 20° C.)

ABS polymer B (a) 70 parts by weight of a graft polymer prepared by grafting 35 parts by weight of styrene and 15 parts by weight of acrylonitrile on 50 parts by weight of a fine textured polybutadiene having an average particle diameter of 0.05–0.15μ and (b) 30 parts by weight of a copolymer of styrene/acrylonitrile in proportions of 70:30 having an intrinsic viscosity of $[\eta]=80.9$.

| Examples 12–15 | Proportion in the total mixture in parts by weight | | | |
|---|---|---|---|---|
|  | (12) | (13) | (14) | (15) |
| Polycarbonate | 45 | 45 | 45 | 45 |
| ABS polymer A | 55 | 55 | 55 | 55 |
| Stabilizer of Example 2 | — | 0.25 | — | 0.1 |
| Stabilizer of Example 7 | — | — | 0.25 | 0.1 |
| Notched impact strength kJ/m² | 13.7 | 30.2 | 29.1 | 33.0 |
| Optical assessment 250° C. | 1 | 1 | 1 | 1 |
| After injection moulding 260° C. | 1 | 1 | 1 | 1 |
| at temperature 270° C. | 3 | 1 | 1–2 | 1 |
| at temperature 280° C. | 4 | 2 | 2 | 2 |

| Examples 16–23 | Proportions in total mixture (in parts by weight) | | | | | | | |
|---|---|---|---|---|---|---|---|---|
|  | (16) | (17) | (18) | (19) | (20) | (21) | (22) | (23) |
| Polycarbonate | 60 | 60 | 60 | 60 | 60 | 60 | 60 | 60 |
| ABS polymer A | 40 | 40 | 40 | — | 40 | 40 | 40 | — |
| ABS polymer B | — | — | — | 40 | — | — | — | 40 |
| Stabilizer of Example 2 | — | 0.1 | 0.25 | 0.25 | — | — | 0.1 | — |
| Stabilizer of Example 9 | — | — | — | — | 0.25 | — | — | — |
| Stabilizer of Example 11 | — | — | — | — | — | 0.25 | — | — |
| Stabilizer of Example 8 | — | — | — | — | — | — | — | 0.25 |
| Optical assessment 270° | 2 | 1 | 1 | 1 | 1 | 1 | 1 | 1 |
| After injection moulding 280° C. | 4 | 1 | 1 | 1 | 1 | 1 | 1 | 1 |
| at temperature 290° C. | 5 | 2 | 1 | 2 | 1 | 3 | 2 | 3 |
| at temperature 300° C. | — | 4 | 4 | 4 | 3 | 4 | 5 | 5 |

| Examples 23–26 | Proportion in total mixture (in parts by weight) | | | |
|---|---|---|---|---|
|  | (23) | (24) | (25) | (26) |
| Polycarbonate | 70 | 70 | 70 | 70 |
| ABS polymer A | 30 | 30 | 30 | 30 |
| Stabilizer of Example 2 | — | 0.1 | 0.25 | — |
| Stabilizer of Example 11 | — | — | — | 0.25 |
| Optical assessment 270° C. | 1 | 1 | 1 | 1 |
| After injection moulding 280° C. | 1 | 1 | 1 | 1 |
| at temperature 290° C. | 4 | 2 | 1 | 1 |
| at temperature 300° C. | 6 | 3 | 3 | 4 |
| Notched impact strength 280° C. kJ/m² 300° C. | 61 | 48 | 53 | 46 |
|  | 12 | 22 | 24 | 20 |
| Melting characteristics IMI g/10 min | 7.3 | 7.9 | 8.2 | 7.8 |

We claim:

1. A mixture consisting essentially of an aromatic carbonate, an ABS polymer and from 0.01 to 3.0% by weight, based on the weight of the mixture, of a stabilizer selected from the group consisting of

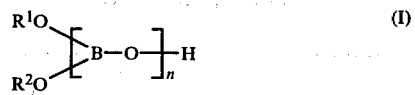

wherein n is 1 and $R^1$ and $R^2$ are each $C_1$–$C_{18}$ alkyl, $C_5$–$C_{15}$ cycloalkyl, $C_7$–$C_{24}$ aralkyl or alkaryl or $C_6$–$C_{24}$ aryl and

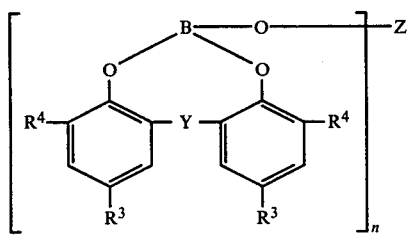
(III)

wherein n is an integer of from 1 to 4, Z is hydrogen or an aliphatic, cycloaliphatic or aromatic hydrocarbon group having 1–18 carbon atoms, $R^3$ and $R^4$ are each a $C_1$–$C_9$ aliphatic hydrocarbon, a $C_5$–$C_6$ cycloaliphatic hydrocarbon, or a $C_7$–$C_9$ aralkyl or a $C_6$–$C_{10}$ aryl group and Y is $HCR^5$ wherein $R^5$ is hydrogen, a $C_1$–$C_6$ alkyl, a cyclohexenyl or a cyclohexyl group.

2. A mixture of claim 1 wherein formula (I) is selected as said stabilizer and $R^1$ and $R^2$ are $C_7$–$C_{24}$ alkaryl.

3. A mixture of claim 1 wherein formula (III) is selected as the stabilizer, $R^3$ is $C_1$–$C_9$ alkyl, $C_5$–$C_6$ cycloalkyl, $C_7$–$C_9$ aralkyl or $C_6$–$C_{10}$ aryl, $R^4$ is benzyl, $\beta$-methylbenzyl, $\alpha,\alpha$-dimethylbenzyl, methyl, ethyl, isopropyl, tertiary butyl, tertiary amyl, isononyl, cyclopentyl or cyclohexyl and Y is $CH_2$, $CH_3$—CH, $CH_3CH_2CH$, $CH_3CH_2CH_2$—CH, $(CH_3)_2CH$—CH,

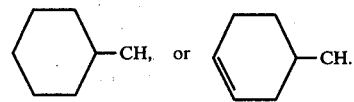

* * * * *